United States Patent [19]
Langenfeld et al.

[11] Patent Number: 5,997,237
[45] Date of Patent: Dec. 7, 1999

[54] CLAM SHELL BUCKET AND METHOD OF OPERATING

[75] Inventors: Joseph W. Langenfeld, Onawa, Iowa; Neal W. Westendorf, Dakota Dunes, S. Dak.

[73] Assignee: Westendorf Manufacturing Co., Inc., Onawa, Iowa

[21] Appl. No.: 09/163,902

[22] Filed: Sep. 30, 1998

[51] Int. Cl.⁶ .................................................. E02F 03/00
[52] U.S. Cl. .......................... 414/723; 414/726; 37/406
[58] Field of Search .................................... 414/704, 721, 414/722, 726, 740, 685, 723; 37/406

[56] References Cited

U.S. PATENT DOCUMENTS

| | | |
|---|---|---|
| 2,326,338 | 8/1943 | Drott et al. . |
| 2,812,595 | 11/1957 | Drott . |
| 3,077,999 | 2/1963 | Svoboda . |
| 3,209,474 | 10/1965 | Artman .................................... 414/726 |
| 3,243,905 | 4/1966 | Ulrich . |
| 3,344,540 | 10/1967 | Ulrich ....................................... 37/406 |
| 3,455,477 | 7/1969 | Blair . |
| 4,051,962 | 10/1977 | Westendorf .............................. 414/723 |
| 4,372,063 | 2/1983 | Work . |
| 4,565,485 | 1/1986 | Wilman .................................... 414/726 |
| 4,566,844 | 1/1986 | Campin .................................... 414/726 |
| 4,621,973 | 11/1986 | Langenfeld et al. . |
| 4,746,254 | 5/1988 | Langenfeld et al. . |
| 4,753,568 | 6/1988 | Langenfeld et al. . |
| 4,787,811 | 11/1988 | Langenfeld et al. . |
| 4,797,051 | 1/1989 | Langenfeld et al. . |
| 4,859,130 | 8/1989 | Langenfeld et al. . |
| 4,890,400 | 1/1990 | Long ........................................ 414/726 |
| 4,915,575 | 4/1990 | Langenfeld et al. . |
| 4,928,410 | 5/1990 | Walters et al. . |
| 4,930,974 | 6/1990 | Langenfeld et al. ..................... 414/723 |
| 4,968,213 | 11/1990 | Langenfeld et al. . |
| 5,121,557 | 6/1992 | Moore ....................................... 37/406 |
| 5,466,113 | 11/1995 | Norberg ................................... 414/723 |

*Primary Examiner*—Robert P. Olszewski
*Assistant Examiner*—Gregory A. Morse
*Attorney, Agent, or Firm*—Merchant & Gould P.C.

[57] ABSTRACT

A clam shell bucket is provided. The clam shell bucket includes a first frame rotatably connected to a second frame along a pivot point to provide rotation of the first and second frames between a pincer configuration and a scooping configuration. The first frame includes a bucket floor having a pincer end and a scraper end; a pair of side walls extending from the bucket floor to the pivot point; support blade provided between the pair of side walls and extending from the bucket floor to the pivot point; a plurality of pincer teeth extending from the pincer end of the bucket floor; and a scraper blade extending from the scraper end of the bucket floor. The second frame includes a rear bucket wall including a pincer end; a plurality of pincer teeth extending along the pincer end of the rear bucket wall; and a plurality of support arms extending from the rear bucket wall to the pivot point. A method of operating the bucket is provided.

10 Claims, 5 Drawing Sheets

CLAM SHELL BUCKET AND METHOD OF OPERATING

FIELD OF THE INVENTION

The invention relates to a material handling device, and more particularly to a clam shell bucket for use on a tractor, and to a method for operating a clam shell bucket.

BACKGROUND OF THE INVENTION

Clam shell type buckets are known. In general, clam shell buckets include a back or rearward frame and an opposed shell or movable frame. The back or rearward frame is attached to the loader arms of the tractor, and the shell or movable frame rotates relative to the back jaw to provide a bucket for scooping or a pincer for grabbing and lifting relatively small items including logs and unbaled silage.

Attempts have been made to improve the usefulness of clam shell buckets in a farming environment. As described in U.S. Pat. No. 3,455,477 to Blair, web plates can be installed beneath tines so that the spaces between the tines are covered, and side plates can be attached so that a loader can function as a scoop. When a bucket loading operation is completed, and the device is once again required for use as a silage grab, the plates are removed. U.S. Pat. No. 4,565,484 to Wilman describes an apparatus which can be used as a silage grab or as a bucket loader without having to fit or remove additional components.

SUMMARY OF THE INVENTION

A clam shell bucket is provided. The clam shell bucket includes a first frame rotatably connected to a second frame along a pivot point to provide rotation of the first and second frames between a pincer configuration and a scooping configuration. The first frame includes a bucket floor having a pincer end and a scraper end; a pair of side walls extending from the bucket floor to the pivot point; support blade provided between the pair of side walls and extending from the bucket floor to the pivot point; a plurality of pincer teeth extending from the pincer end of the bucket floor; and a scraper blade extending from the scraper end of the bucket floor. The second frame includes a rear bucket wall including a pincer end; a plurality of pincer teeth extending along the pincer end of the rear bucket wall; and a plurality of support arms extending from the rear bucket wall to the pivot point.

When the clam shell bucket is provided in a scooping configuration, the pincer teeth extending along the pincer end of the rear bucket wall support the forward bucket floor. In addition, the pincer teeth extending from the pincer end of the bucket floor extend underneath the rear bucket wall and support the second frame.

Hydraulic cylinders are preferably provided on each side of the clam shell bucket to control the rotation of the first frame relative to the second frame.

The support blade is preferably provided as a diamond shaped structure to help the bucket withstand the twisting forces caused when it is used as a grasp and one end of the bucket closes while the other end remains open. The pincer teeth are preferably provided with a tapered configuration. The teeth are tapered from the exterior side to both the forward point and the rearward point. This tapered configuration allows the bucket to roll when provided in a closed scooping position without the pincer teeth engaging the ground.

A method of operating a clam shell bucket is provided by the invention. The method includes steps of providing clam shell bucket, and rotating the first and second frames between a pincer configuration and a scooping configuration. The pincer teeth are preferably sufficiently short to avoid catching the ground when the bucket is provided in a scooping configuration and the bucket is rolled.

DETAILED DESCRIPTION OF THE PREFERRED EMBODIMENT

Figure 1:
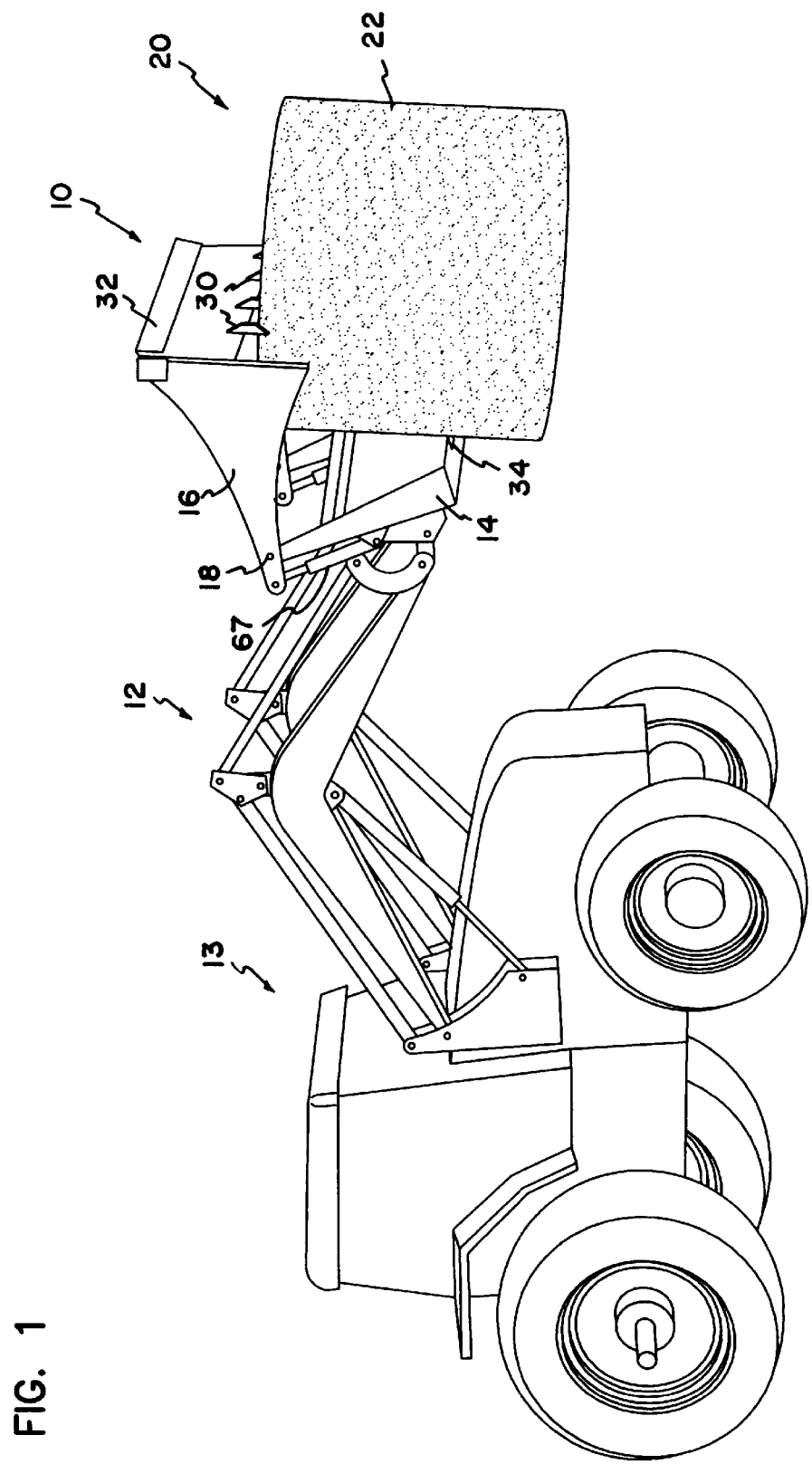
FIG. 1 is a front perspective view of the clam shell bucket according to the principles of the present invention, shown attached to a tractor.

Now referring to FIG. 1, a clam shell bucket 10 is shown attached to the loader 12 of a tractor 13. The clam shell bucket 10 functions both as a pincer for grabbing articles, and as a bucket for scooping dry or wet materials. The clam shell bucket 10 can be referred to more simply as the bucket. When the bucket 10 functions as a pincer or grab, it can be used for picking up and moving materials such as baled and unbaled silage, including hay and straw, logs, or other articles which are bulky and difficult to scoop. When the bucket 10 functions as a scoop, it can be used for picking up and moving dry or wet materials such as manure, corn cobs, feed, dirt, sand, gravel, snow, and fertilizer.

Figure 2:
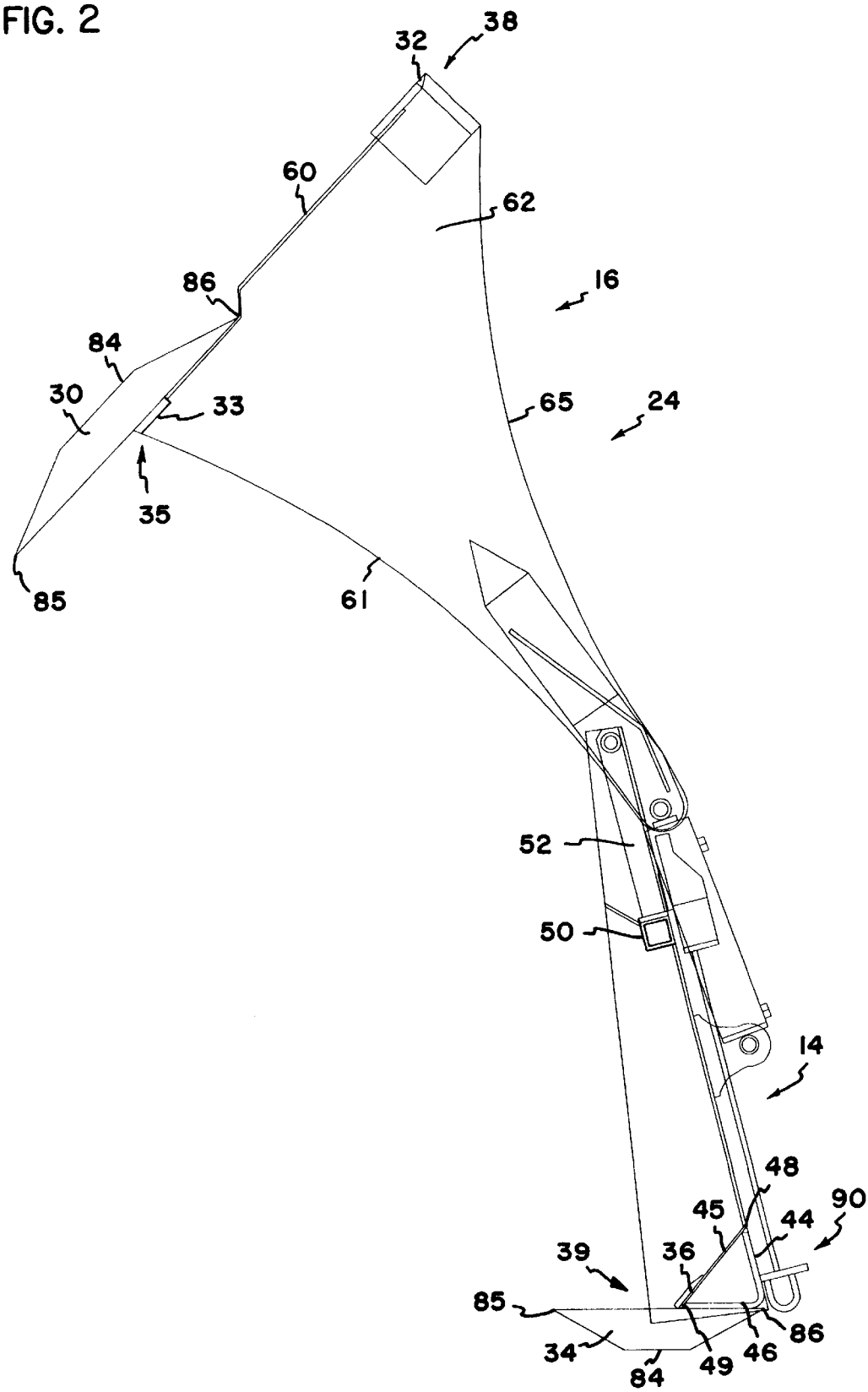
FIG. 2 is a partial sectional view of the clam shell bucket of FIG. 1 in an open grasping position.
Figure 3:
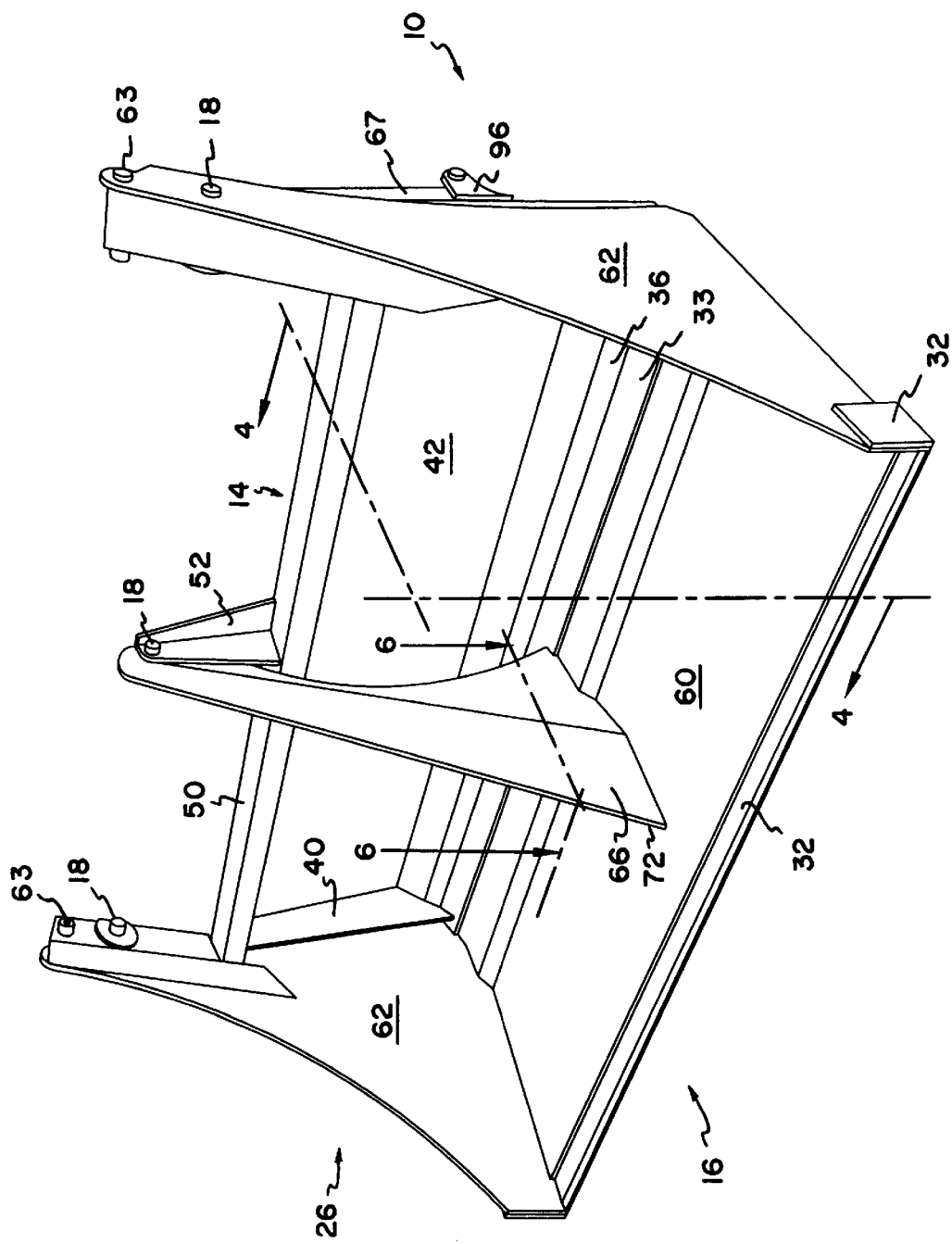
FIG. 3 is a perspective view of the clam shell bucket of FIG. 1 in a closed scooping position.
Figure 4:
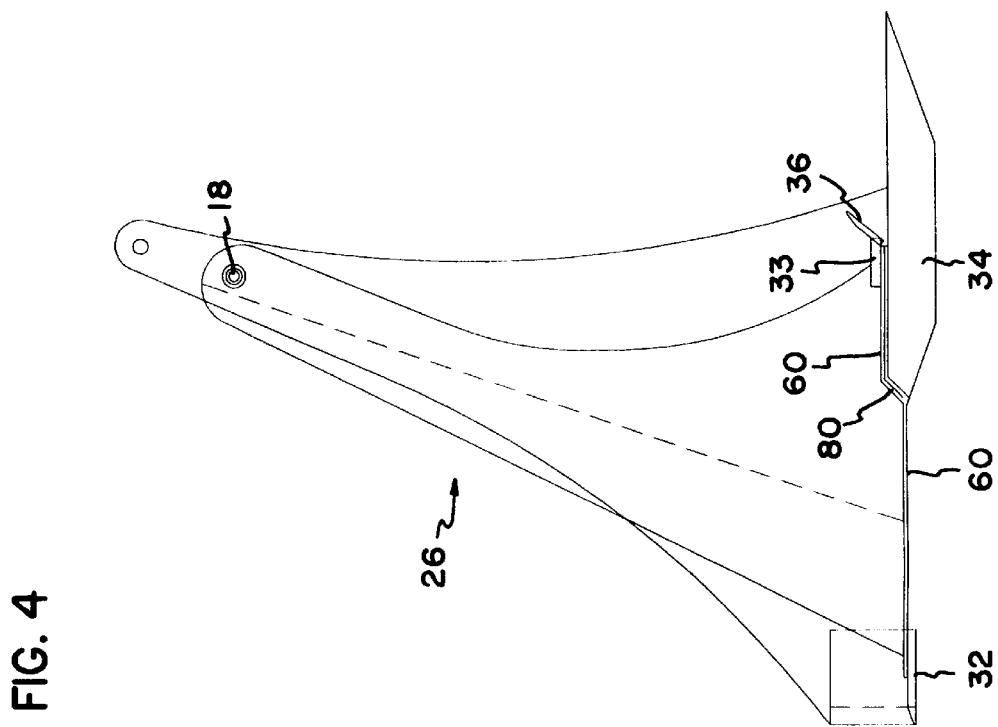
FIG. 4 is a partial sectional view of the clam shell bucket of FIG. 3 taken along lines 4—4.
Figure 5:
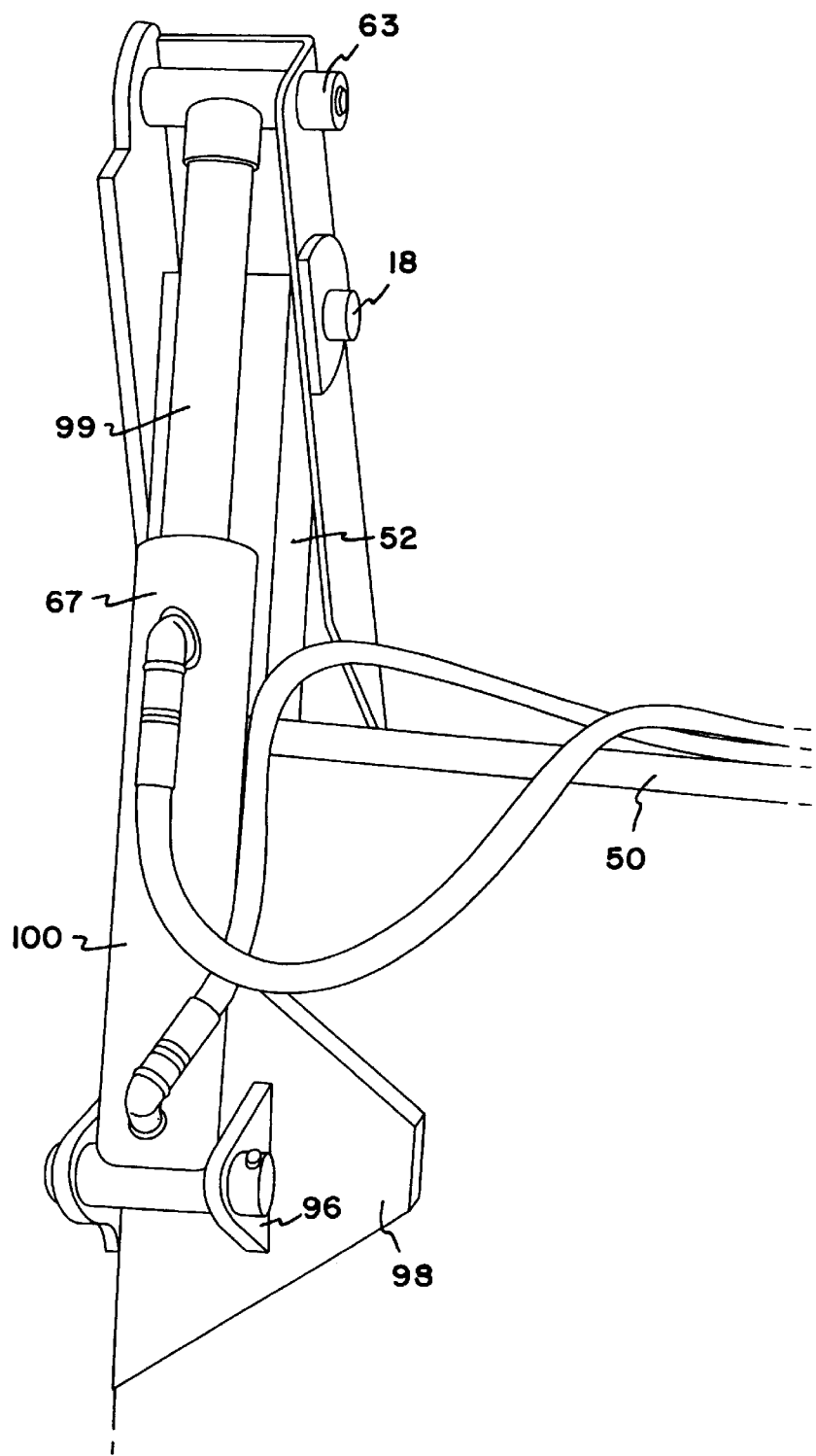
FIG. 5 is a rear view of the clam shell bucket of FIG. 1 in a closed scooping position.

Now referring to FIGS. 2–4, the bucket 10 includes a back frame 14 and a shell frame 16 which pivot relative to each other about a pivot point 18. In typical operation of the bucket 10, the back frame 14 is relatively stable because it is attached to the loader 12. It is the shell frame 16 which rotates about the pivot point 18 relative to the back frame 14. It should be appreciated, however, that the back frame 14 is capable of rotating in a manner common for buckets.

In FIG. 1, the bucket 10 is shown in a closed pincer position 20 grasping a bale of hay 22. The closed pincer position refers to the configuration of the bucket 10 when it is acting as a pincer or grab and is holding an article. FIG. 2 shows the bucket 10 in an open position 24. The open position refers to the configuration of the bucket 10 when it is not grabbing or grasping an article as a pincer or holding material as a bucket. Accordingly, the bucket 10 may be either about to grasp an article or it may have just released an article. Preferably, the bucket opens sufficiently wide to accept a bale of hay. Although FIG. 2 shows the bucket 10 in a fairly wide open position, the open position 24 include the configuration where the separation between the back frame 14 and the shell frame 16 is sufficiently small to allow materials to flow out of the scoop. FIG. 3 shows the bucket 10 in a closed scooping position 26 where the shell frame 16 nests within the back frame 14. When the bucket 10 is provided in this configuration, it can fiction as a scoop for transporting dry or wet materials. The materials can be released from the bucket 10 by separating the shell frame 16 from the back frame 14, or the materials can be dumped out by rolling the bucket.

The shell frame 16 includes upper pincer teeth 30 and a primary scraper blade 32. The primary scraper blade 32 extends along the length of the bucket 10 and partway up the sides. Preferably, the blade extends about six inches up the sides of the bucket. The scraper blade 32 is provided as the initial blade for scooping dry or wet materials. The scraper blade 32, as well as the other blades described herein, should be prepared of a sufficiently strong material, such as high grade steel, to resist damage from hard objects including rocks and metal. Additionally included is a sealing blade 33 along the pincer 35 of the shell frame 16. The sealing blade 33 is preferably provided for resisting damage from hard objects including rocks and metal, and for assisting in sealing the closure between the shell frame 16 and the back frame 14.

The back frame 14 includes lower pincer teeth 34 and a secondary scraper blade 36. Accordingly, when the bucket 10 is used as a pincer, the upper teeth 30 and the lower teeth 34 pince or grap an article, such as a bale of hay or a log, and hold the article therein. When the loader is used as a bucket or scoop, the shell frame 16 nests within the back frame 14 and the primary scraper blade 32 first engages the material, such as dirt and rocks, which is to be scooped up and moved. Accordingly, the primary scraper blade 32 protects the shell frame leading edge 38, and the secondary scraper blade 36 is provided for protecting the back frame leading edge 39. The back frame leading edge 39 can be referred to as the pincer end of the back frame 14. The secondary blade 36 provides additional strength for the back frame 14.

The back frame 14 includes side walls 40 and back wall 42. In order to provide secure attachment of the lower pincer teeth 34 to the back frame 14, a bottom support 44 is provided. The bottom support 44 is preferably triangular in shape and can be formed by angling the back wall 42 forward and welding an elbow 46 thereto at locations 48 and 49. The bottom support 44 includes a surface 45 along which the secondary scraper blade 36 can be provided.

The back frame 14 includes tubing 50 along the upper edge of the back wall 42. The tubing 50 provides additional strength for the back frame 14 and helps retain material within the bucket when it is rolled or rotated backward. The tubing 50 is preferably a square tubing. Additionally included are support arms 52 extending from the back wall 42 to the pivot point 18. The bottom support 44 and the tubing 50 advantageously provide structural support for the back frame 14 while providing a sufficiently light structure.

The shell frame 16 includes a bucket floor 60 which is used to hold the material when the bucket 10 is used as a bucket or scoop. In order to support the weight of the material, side walls 62 and support blade 66 are provided. The side walls 62 extend from the bucket floor 60 to the pivot point 18 and then beyond to the hydraulic cylinder attachment pivot point 63. The distance between the pivot point 18 and the hydraulic cylinder attachment pivot point 63 provides the leverage which allows the hydraulic cylinder 67 to cause the shell frame 16 to rotate relative to the back frame 14. The leverage distance is preferably provided so that the hydraulic cylinder 67 does not stick out too far from the back wall 42. That is, it is desirable to provide the bucket 10 with a relatively compact appearance. The support blade 66 extends from the bucket floor 60 to the pivot point 18.

The side walls 62 are preferably provided with curved edges 61 and 65. The curved edge 61 is provided for allowing the bucket 10 to hold bulky or rounded articles, such as bales, when functioning as a grab or pincer. The curved edge 65 is provided for helping to reduce the weight by eliminating material.

Figure 6:
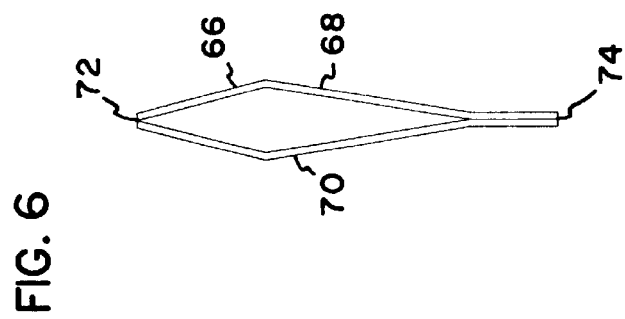
FIG. 6 is a partial sectional view of the support blade of the clam shell bucket of FIG. 3 taken along lines 6—6.

Now referring to FIG. 6, the support blade 66 is preferably provided as a diamond shaped structure having a hollow interior. A hollow structure provides for reduced weight while maintaining sufficient rigidity. The support blade 66 preferably includes walls 68 and 70 which are welded together to provide a blade edge 72 and a trailing edge 74. The support blade 66 extends from the bucket floor 60 to the pivot point 18 for attachment to arm 52. The shape of the support blade 66 is helpful for providing sufficient structure for the bucket 10. Under certain circumstances, it is expected that the bucket will twist when used as a grab. For example, if an article such as a log is caught between the back frame 14 and the shell frame 16, and is closer to one of the side walls 62, the bucket will have a tendency to twist as it closes. That is, one end of the bucket will tend to close while the other end remains open. The support blade 66 is provided to help the bucket withstand the twisting motion when one side of the bucket closes and the other side does not. The diamond shaped structure of the support blade assists in providing this structural support for the bucket under twisting conditions. In addition, the support blade 66 exhibits memory which assists the bucket in untwisting once the bucket releases the article. That is, the support blade helps the bucket return to its original shape once it is opened. Prior art buckets have a tendency to retain the twisted shape once they open. Furthermore, the support blade 66 is preferably recessed from the leading edge 38. This reduces the interference of the support blade 66 during scooping operations.

The bucket floor 60 of the shell frame 16 includes a ridge 80. This ridge 80 extends the bucket floor upwardly and allows for the lower pincer teeth 34 to fit underneath the bucket floor 60 when the bucket 10 is provided in a closed scooping position 26. Accordingly, the lower pincer teeth 34 help support the shell frame 16. Similarly, the upper pincer teeth 30 fit underneath and support the back frame 16.

The bucket 10 includes a sufficient number of upper pincer teeth 30 and lower pincer teeth 34 to provide a desired pincing or grabbing effect. For an 84" wide bucket, it is preferable to provide seven upper pincer teeth and nine lower pincer teeth. Of course, the number of pincer teeth can vary with the size of the bucket and the length of the teeth. One skilled in the art would appreciate how the number of pincer teeth can be altered. One may wish to use fewer teeth in a 72" wide bucket. It should be appreciated that the upper pincer teeth 30 and the lower pincer teeth 34 should intermesh to provide additional support when the bucket 10 is provided in the closed scooping position 26.

The upper pincer teeth 30 and the lower pincer teeth 34 are preferably provided with a tapered configuration. That is, the teeth are tapered from the exterior side 84 to the forward point 85. Preferably, the teeth are tapered to the rearward point 86 as well. This tapered configuration allows the bucket 10 to roll when provided in a closed scooping position 26 without the teeth engaging the ground. The pincer teeth 30 and 34 should have a length which is sufficiently long to allow the bucket to grab or grasp a bale of hay. The length of the pincer teeth should not be so long that they interfere with the use of the bucket 10 as a scoop. If the pincer teeth are too long, it is expected that they would interfere with the roll of the bucket by engaging the ground. In addition, the pincer teeth 34 should be sufficiently long to help support the shell frame 16. The length of the pincer teeth extending away from the pincer end of the back frame and the pincer end of the shell frame can vary. In general, the length of the teeth extending away from the pincer end should be greater than about five inches to provide sufficient grasping of bales, and should be less than about 20 inches so as not to interfere with the roll of the bucket. Preferably, the upper pincer teeth are provided with a length extending away from the pincer edge 35 of between about 10 inches and 16 inches. The lower pincer teeth preferably have a length extending away from the pincer edge 39 of between about 6 inches and about 12 inches.

The back frame 14 includes a coupler 90 for attachment of a quick attach device thereto. A quick attachment device which is useful in the present invention is described by U.S. Pat. Nos. 4,051,962 and 4,930,974, the entire disclosures of which are incorporated herein by reference. In general, the quick attachment device is pivoted by a hydraulic cylinder which is part of the tractor loader.

The back frame 14 includes a mount 96 for attachment of the hydraulic cylinder 67. Preferably, a reinforcement plate 98 is provided to help secure the hydraulic cylinder to the back frame 14. The bucket 10 preferably includes two hydraulic cylinders 67, one at each end of the bucket. The hydraulic cylinders 67 are provided so they rotate relative to the mount 96 as the piston 99 moves within the cylinder housing 100.

It should be appreciated that the bucket of the present invention is particularly useful for farm applications. In particular, the bucket is useful for farm applications requiring a lightweight bucket which is sufficiently large to hold large amounts of lightweight materials and strong enough to handle large bulky articles such as bales of hay or silage. In order to handle the large bulky articles, the separation of the pincer teeth when the bucket is provided in an open position is preferably greater than about 40 inches. Preferably, the bucket opens to a distance of greater than 60 inches, and may even be as great as about 67 inches. This allows the bucket to grab large bales of hay or silage. In addition, the bucket is preferably fairly wide. Preferably, the bucket is greater than about 70 inches wide. A preferred width is about 84 inches. This allows one to scoop large amounts of light weight products including hay and feed. A particular advantage of the invention is that the bucket can provide these large dimensions compared with the prior art, without being too heavy for use on conventional farm tractor equipment.

It is expected that one can use the bucket in, for example, feed yards where food additives including fines, loose hay or silage, and corn stalks are mixes with a bale of hay. The bucket is capable of loading the loose materials as well as the bulky articles into a mixer wagon. Furthermore, the bucket can be useful as a rake by causing the upper teeth to rake the ground against the back frame.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A clam shell bucket comprising:
    a first frame rotatably connected to a second frame along a pivot point to provide rotation of said first and second frames between a pincer configuration and a scooping configuration;
    said first frame comprising:
        a bucket floor having a pincer end and a scraper end;
        a pair of side walls extending from said bucket floor to said pivot point;
        support blade provided between said pair of side walls and extending from said bucket floor to said pivot point, said support blade comprising a hollow interior;
        a plurality of pincer teeth extending from the pincer end of said bucket floor;
        a scraper blade extending from the scraper end of said bucket floor; and
    said second frame comprising:
        a rear bucket wall including a pincer end;
        a plurality of pincer teeth extending from the pincer end of the rear bucket wall;
        a plurality of support arms extending from the pincer end of the rear bucket wall to said pivot point.

2. A clam shell bucket according to claim 1, wherein the pincer teeth extending along the pincer end of the rear bucket wall support the bucket floor when said first frame and said second frame are provided in a scooping configuration.

3. A clam shell bucket according to claim 1, further comprising at least one hydraulic cylinder having a first end attached to said first frame and a second end attached to said second frame to provide rotation of said first frame relative to said second frame about said pivot point.

4. A clam shell bucket according to claim 3, comprising at least two hydraulic cylinders.

5. A clam shell bucket according to claim 1, wherein the second frame comprises a quick attachment receiver.

6. A clam shell bucket according to claim 1, wherein the support blade comprises a diamond shaped configuration.

7. A clam shell bucket according to claim 1, wherein the second frame further comprises a blade at the pincer end of said bucket plate.

8. A clam shell bucket comprising:
    a first frame rotatably connected to a second frame along a pivot point to provide rotation of said first and second frames between a pincer configuration and a scooping configuration;
    said first frame comprising:
        a bucket floor having a pincer end and a scraper end;
        a pair of side walls extending from said bucket floor to said pivot point;
        a plurality of pincer teeth extending from the pincer end of said bucket floor, said pincer teeth having a tapered configuration;
        a scraper blade extending from the scraper end of said bucket floor;
    said second frame comprising:
        a rear bucket wall including a pincer end and a back wall;
        a plurality of pincer teeth extending from the pincer end of the rear bucket wall, said pincer teeth having a tapered configuration;
        a plurality of support arms extending from the pincer end of the rear bucket wall to said pivot point; and
    said plurality of pincer teeth extending from the pincer end of said bucket floor do not extend beyond the back wall of said rear bucket wall when said first frame and said second frame are provided in a scooping configuration to an extent to interfere with the roll of the clam shell bucket in the scooping configuration by engaging ground.

9. A method of operating a clam shell bucket comprising steps of:
    (a) providing a clam shell bucket having a first frame rotatably connected to a second frame along a pivot point to provide rotation of said first and second frames between a pincer configuration and a scooping configuration;
    said first frame comprising:
        a bucket floor having a pincer end and a scraper end;

a pair of side walls extending from said bucket floor to said pivot point;

support blade provided between said pair of side walls and extending from said bucket floor to said pivot point, said support blade comprising a hollow interior;

a plurality of pincer teeth extending from the pincer end of said bucket floor;

a scraper blade extending from the scraper end of said bucket floor; and said second frame comprising:

a rear bucket wall including a pincer end;

a plurality of pincer teeth extending from the pincer end of the rear bucket wall;

a plurality of support arms extending from the pincer end of the rear bucket wall to said pivot point; and (b) rotating said first and second frames between a pincer configuration and a scooping configuration.

10. A method of operating a clam shell bucket comprising steps of:

(a) providing a clam shell bucket having a first frame rotatably connected to a second frame along a pivot point to provide rotation of said first and second frames between a pincer configuration and a scooping configuration;

said first frame comprising:

a bucket floor having a pincer end and a scraper end;

a pair of side walls extending from said bucket floor to said pivot point;

a plurality of pincer teeth extending from the pincer end of said bucket floor, said pincer teeth having a tapered configuration;

a scraper blade extending from the scraper end of said bucket floor;

said second frame comprising:

a rear bucket wall including a pincer end and a back wall;

a plurality of pincer teeth extending from the pincer end of the rear bucket wall, said pincer teeth having a tapered configuration;

a plurality of support arms extending from the pincer end of the rear bucket wall to said pivot point; and said plurality of pincer teeth extending from the pincer end of said bucket floor do not extend beyond the back wall of said rear bucket wall when said first frame and said second frame are provided in a scooping configuration to an extent to interfere with the roll of the clam shell bucket in the scooping configuration by engaging ground; and (b) rotating said first and second frames between a pincer configuration and a scooping configuration.

* * * * *

UNITED STATES PATENT AND TRADEMARK OFFICE
CERTIFICATE OF CORRECTION

PATENT NO. : 5,997,237
DATED : DECEMBER 7, 1999
INVENTOR(S) : LANGENFELD ET AL.

It is certified that error appears in the above-identified patent and that said Letters Patent is hereby corrected as shown below:

Col. 1, line 25: "4,565,484" should read --4,565,485--

Signed and Sealed this

First Day of May, 2001

Attest:

NICHOLAS P. GODICI

*Attesting Officer*        *Acting Director of the United States Patent and Trademark Office*